(12) United States Patent
Clark

(10) Patent No.: US 6,264,232 B1
(45) Date of Patent: Jul. 24, 2001

(54) AIR BAG SENSOR MODULE INSTALLATION APPARATUS AND METHOD

(75) Inventor: Jeffrey Allen Clark, Sterling Heights, MI (US)

(73) Assignee: Siemens Automotive Corporation, Auburn HIlls, MI (US)

( * ) Notice: Subject to any disclaimer, the term of this patent is extended or adjusted under 35 U.S.C. 154(b) by 0 days.

(21) Appl. No.: 09/500,769

(22) Filed: Feb. 8, 2000

(51) Int. Cl.$^7$ .................................................. B60R 21/16
(52) U.S. Cl. ...................... 280/728.2; 280/731; 280/732
(58) Field of Search ........................... 280/728.2, 730.2, 280/731, 732

(56) References Cited

U.S. PATENT DOCUMENTS 5,547,214 * 8/1996 Zimmerman, II et al. ....... 280/730.2
5,890,733 * 4/1999 Dillion ............................... 280/728.2

FOREIGN PATENT DOCUMENTS 5217018 9/1993 (JP).
WO 9819892 5/1998 (WO).

* cited by examiner

Primary Examiner—Kenneth R. Rice

(57) ABSTRACT

An air bag module for sensing a crash condition of a vehicle mounted on mounting portion of a vehicle. Mounting portion includes at least one slot and fastener receiving structure spaced from the slot. The air bag module includes housing having first and second opposing ends. At least one mounting tab extends from the first end of the housing. Fastener is provided at the second end of housing. Fastener is sized to be received by fastener receiving structure. Mounting tab is constructed and arranged such that when it inserted into the slot in the mounting portion of the vehicle and when fastener is received by fastener receiving structure, mounting tab will deflect to be in a compressive state, with fastener and mounting tab securing air bag module to mounting portion of the vehicle.

25 Claims, 1 Drawing Sheet

AIR BAG SENSOR MODULE INSTALLATION APPARATUS AND METHOD

BACKGROUND OF THE INVENTION

1. Field of the Invention

This invention relates to an air bag module for a vehicle, and more particularly, to an apparatus and method for installing an air bag module having a crash sensor disposed therein onto a vehicle.

2. Related Art

Air bag modules conventionally include a crash sensor and are mounted on a vehicle in a manner to transmit crash information from the vehicle body to the crash sensor. Diagnostic circuits evaluate the crash information and discriminate between a fire and a no fire condition. In this regard, the airbag module is mounted on the vehicle such that the crash sensor will be subject to forces that indicate a crash condition. For example, the crash sensor usually comprises an accelerometer and the air bag module is rigidly coupled to a portion of the vehicle such that deceleration indicative of a crash condition is transmitted to the crash sensor. When a crash condition requiring air bag deployment is detected, the controller associated with the air bag module sends a signal to ignite an air bag deployment device.

Typically, in order to secure the air bag module to the vehicle, an additional mounting bracket is required to interface between the module and the contour of the vehicle. Standard vehicle mounting technology requires an OEM to supply and properly mount three to four fasteners to join the mounting bracket and module to the vehicle to ensure adequate crash pulse transmission and effective crash discrimination. A disadvantage of this method is that if any number or combination of fasteners is improperly fastened or missing, crash indications may not be properly transmitted to the crash sensor. In that case, the performance of the air bag protection system may be compromised.

The standard mounting technology may also be problematic in terms of maintaining the efficiency of the vehicle assembly process if the air bag module must be mounted in a difficult-to-access location. If the mounting location is difficult to reach, for example, under the dashboard, an assembler may be forced to spend a relatively large amount of time to properly position and mount the air bag module.

Accordingly, there is a need to provide a relatively simple mounting arrangement to mount an air bag module to a vehicle. In particular, it is desirable to provide a mounting arrangement which does not require OEMs to supply fasteners, yet provides the appropriate "hard mounts" to promote adequate crash indication transmission and crash discrimination.

SUMMARY OF THE INVENTION

An object of the present invention is to fulfill the need referred to above. In accordance with the principles of the present invention, this objective is obtained by providing an air bag module for sensing a crash condition of a vehicle. The vehicle has a mounting portion for mounting the air bag module thereto. The mounting portion includes at least one slot and a fastener receiving structure coupled to the slot, the air bag module includes a housing assembly having first and second opposing ends. At least one mounting tab extends from the first end of the housing assembly. A fastener is coupled to the second end of the housing. The mounting tab is constructed and arranged such that when the mounting tab is inserted into the slot in the mounting portion of the vehicle and the fastener is inserted into and coupled with the fastener receiving structure, the mounting tab will deflect to be in a corrosive state, whereby the fastener and mounting tab secure the air bag module to the mounting portion of the vehicle.

In accordance with another aspect of the invention, a method of mounting an air bag module to a vehicle to sense a vehicle crash condition is provided. The vehicle has a mounting portion for mounting the air bag module thereto. The mounting portion includes at least one slot and a fastener receiving structure spaced from the slot. The method includes providing an air bag module comprising a housing assembly having first and second opposing ends. At least one mounting tab extends from the first end of the housing assembly. A stabilizing member protrudes from a surface of the housing assembly adjacent the first end thereof. A fastener is coupled to the second end of the housing assembly. The method also includes inserting the mounting tab into the slot of the vehicle such that a portion of the mounting tab is disposed on a first side of the mounting portion and another portion of the mounting tab is disposed on a second side of the mounting portion opposite the first side, with the stabilizing member contacting the first side of the mounting portion. Finally, the method includes inserting the fastener into and coupling with the fastener-receiving structure causing the mounting tab and the stabilizing member to be in a compressive state and secure the airbag module to the mounting portion.

Other objects, features and characteristic of the present invention, as well as the methods of operation and the functions of the related elements of the structure, the combination of parts and economics of manufacture will become more apparent upon consideration of the following detailed description and appended claims with reference to the accompanying drawings.

BRIEF DESCRIPTION OF THE DRAWINGS

The present invention is described with references to the accompanying drawings wherein.

DETAILED DESCRIPTION OF THE INVENTION

Figure 1:
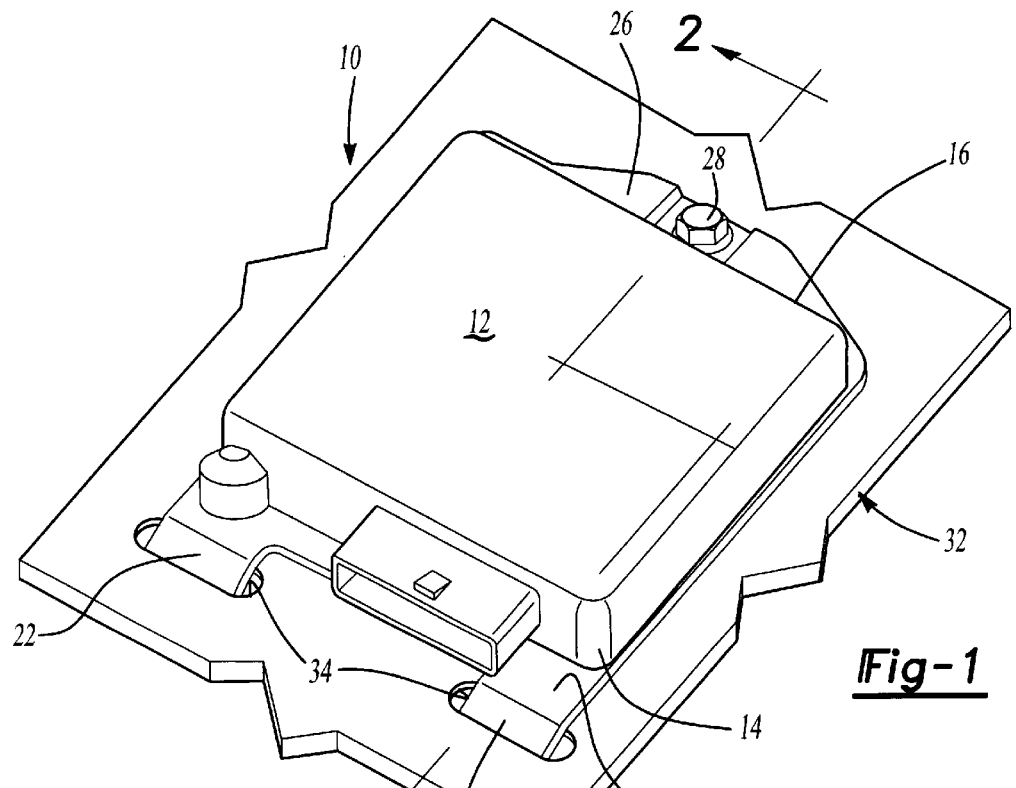
FIG. 1 is a perspective view of an air bag module mounted to a mounting portion of a vehicle in accordance with the principles of the present invention.
Figure 2:
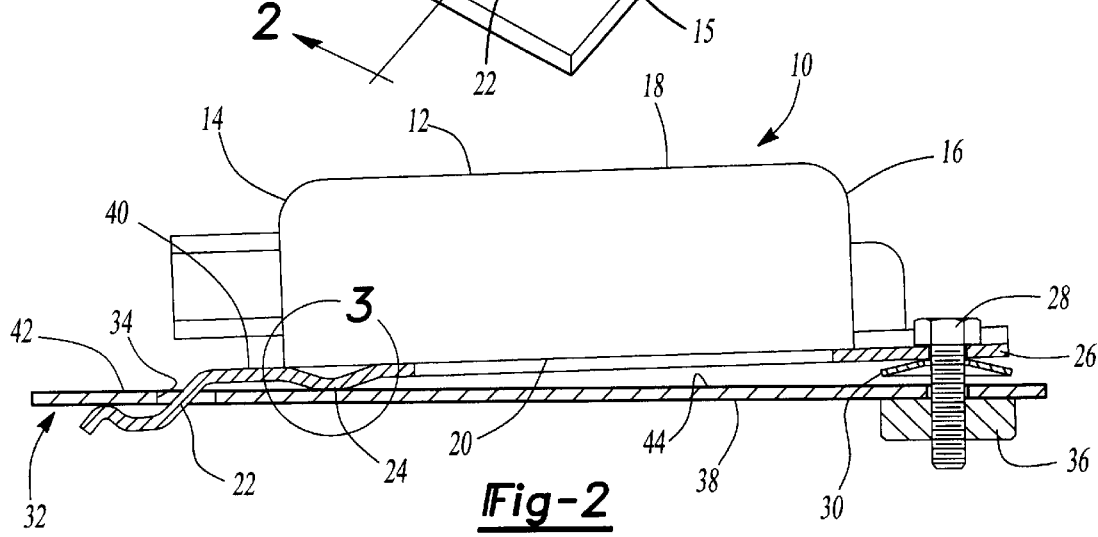
FIG. 2 is cross-sectional view of the air bag module mounted to a mounting portion of a vehicle in accordance with the principles of the present invention.

Referring to FIGS. 1 and 2, an air bag module is shown generally indicated 10, provided in accordance with the principles of the present invention. Air bag module 10 includes housing 12 which typically houses a crash sensor (not shown), for example an accelerometer, and diagnostic circuitry (not shown) to distinguish between a fire and a no fire condition. Advantageously, the accelerometer and diagnostic circuitry may be disposed on a single printed circuit board housed in housing 12. The construction and placement of such accelerometer and diagnostic circuitry are known in the art and will not be discussed in detail here. When a crash condition is determined, module 10 sends a signal to ignite an air bag triggering device (not shown) thereby deploying the airbag.

Figure 3:
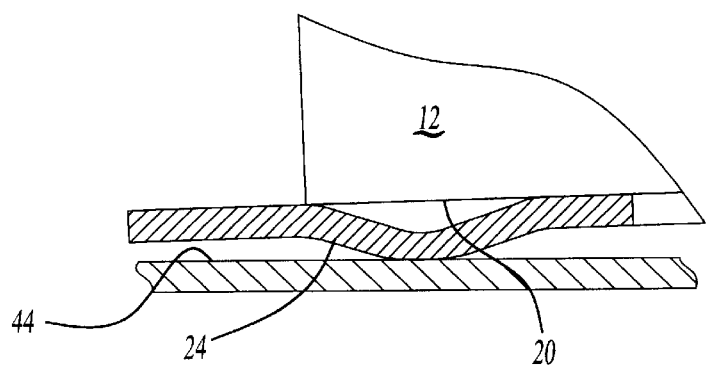
FIG. 3 is an enlarged view of the circled portion in FIG. 2.

Housing 12 has first end 14, second end 16, top surface 18 and bottom surface 20. In the illustrated embodiment, bracket 15, preferably of sheet metal, is mounted to housing 12 at bottom surface 20. Together, the housing 12 and bracket 15 form a housing assembly. It can be appreciated that bracket 15 may be constructed to be an integral part of housing 12. Bracket 15 includes a pair of flexural mounting tabs 22 extending outwardly and in spaced relation with respect to each other from first end 14 of housing 12. As shown in FIG. 3, bracket 15 includes stabilizing member 24, which is preferably a portion of bracket 15 stamped to define a downwardly extending protrusion near first end 14 of housing 12, the function of which will become apparent below.

Second end 16 of housing 12 includes flange member 26, which carries threaded fastener 28. Fastener 28 is preferably an M6 or M8 mounting fastener pre-installed with respect to flange member 26 and secured thereto via locking washer 30.

Air bag module 10 is configured to be mounted to mounting portion 32 of a vehicle. In the illustrated embodiment, mounting portion 32 is a portion of the vehicle's sheet metal and includes first and second slots 34 formed therein. First and second slots 34 are disposed in spaced relation to receive respective mounting tabs 22. Mounting portion 32 also includes a fastener receiving structure in the form of nut 36 secured to underside 38 of mounting portion 32. Nut 36 is threaded to receive and be coupled to fastener 28. It is to be understood that any suitable fastener receiving structure may be used to receive fastener 28, including, but not limited to, a pierced conical hole provided in the sheet metal which could capture the fastener when fastener 28 is inserted therein.

Air bag module 10 is mounted with respect to vehicle mounting portion 32 as follows. Each mounting tab 22 is inserted into a respective slot 34 in mounting portion 32 such that portion 40 of each mounting tab is disposed on one side 44 of mounting portion 32 while another portion 42 of each mounting tab 22 is disposed on an opposite side, or underside 38, of mounting portion 32. At this stage of assembly air bag module 10 will be disposed in an unfastened, angle manner with respect to mounting portion 32. Next, pre-installed fastener 28 is inserted into nut 36 and tightened, which causes module 10 to rest on stabilizing member 24 and causes the mounting tabs to deflect. Both stabilizing member 24 and mounting tabs are in a compressive state, simulating the mounting characteristics of fasteners.

Fastener 28 and the three additional "hard mount" locations (e.g., two mounting tabs 22 and stabilizing member 24) provide the coupling to the mounting structure, in this case mounting portion 32, to promote adequate crash pulse transmission. Although two mounting tabs 22 are shown, it can be appreciated that one generally centrally located mounting tab may be provided instead.

Alternatively, stabilizing member 24 may extend generally the width of module 10 or two stabilizing members may be provided near the edges of the module. Furthermore, although stabilizing member 24 provides an additional "hard mount" location, it can be appreciated that stabilizing member 24 may be omitted.

The foregoing preferred embodiment has been shown and described for the purposes of illustrating the structural and functional principles of the present invention, as well as illustrating the methods of employing the preferred embodiment and is subject to change without departing from such principles. Therefore, this invention includes all modifications encompassed within the spirit of the following claims.

What is claimed is:

1. An air bag module for insertion into a slot on a generally rigid member of a vehicle, said air bag module comprising:

a housing assembly having first and second opposing ends and a bottom sueface; a crash sensor disposed in said housing assembly;

a fastener coupled to said second end of said housing assembly; and a mounting tab extending from said first end downwardly away from said bottom surface with said mounting tab adapted to be inserted into the slot, said mounting tab deflecting to a compressive state when said housing is secured to the generally rigid member by said fastener.

2. The air bag module according to claim 1, wherein said mounting tab comprises a pair of mounting tabs provided in spaced relation at said first end of said housing.

3. The air bag module according to claim 1, wherein said fastener is a threaded fastener.

4. The air bag module according to claim 1, wherein said mounting tab extends downwardly away from said bottom to a concave portion and extends upwardly from said concave portion away from said second end to a pinnacle.

5. An air bag module for insertion into a slot on a generally rigid member of a vehicle, said air bag module comprising:

a housing assembly having first and second opposing ends with a stabilizing member protruding from a bottom surface of said housing assembly near said first end thereof;

a crash sensor disposed in said housing assembly;

a fastener coupled to said second end of said housing assembly; and a mounting assembly tab extending from said first end of said housing assembly; aid mounting tab adapted to be inserted into the slot, said mounting tab deflecting to a compressive state when said housing is secured to the generally rigid member by said fastener with said stabilizing member adapted to engage the rigid member in said compressive state.

6. The air bag module according to claim 5, wherein said housing assembly includes a bracket with said mounting tab and said stabilizing member, and a housing secured to said bracket.

7. The air bag module according to claim 6, wherein said mounting tab and said stabilizing member are integrally formed from sheet metal, said stabilizing member comprising a stamped portion defining a protrusion disposed on said bottom surface of said bracket.

8. A vehicle having an air bag module for sensing a crash condition of said vehicle, said vehicle comprising:

a mounting portion including at least one slot and a fastener receiving structure spaced from said at least one slot;

a housing assembly having a bracket with first and second opposing ends and a housing secured to said bracket;

a crash sensor disposed in said housing;

a fastener provided at said second end of said bracket with said fastener received by the fastener receiving structure; and at least one mounting tab extending from said first end of said bracket, said mounting tab received in said at least one slot of said mounting portion with a portion of said mounting tab disposed on one side of said mounting portion and another portion of said mounting tab disposed on an opposing side of said mounting portion, said mounting tab deflecting to a compressive state when said fastener is received by said fastener receiving structure to secure said housing assembly to the mounting portion of the vehicle.

9. The air bag module according to claim 8, wherein the vehicle mounting portion includes a pair of slots disposed in spaced relation and said mounting tab comprises a pair of mounting tabs disposed in spaced relation at said first end of said housing and adapted to be inserted in said pair of slots.

10. The vehicle according to claim 8, wherein said housing includes a flange portion at said second end remote from said first end and extending away from said housing with said fastener coupled to said flange portion.

11. The vehicle according to claim 10, wherein said fastener is threaded and said fastener receiving structure receives said threaded fastener.

12. The vehicle according to claim 8, wherein said mounting tab extends from said first end downwardly away from a bottom surface of said bracket.

13. The vehicle according to claim 12, wherein said mounting tab extends downwardly away from said bottom to a concave portion and extends upwardly from said concave portion away from said second end to a pinnacle.

14. The vehicle according to claim 13, wherein said pinnacle forms a convex portion.

15. An air bag module for sensing a crash condition of a vehicle, the vehicle having a mounting portion, the mounting portion including at least one slot and a fastener receiving structure spaced from the at least one slot, aid air bag module comprising:

a housing assembly having a bracket with first and second opposing ends and a housing secured to said bracket with a stabilizing member protruding from a bottom surface of said bracket near said first end thereof;

a crash sensor dispose,d in said housing;

a fastener provided at said second end of said bracket said fastener adapted to be received by the fastener receiving structure; and at least one mounting tab extending from said first end of said bracket said in tab adapted to be inserted into the at least one slot of the mounting portion with a portion of the mounting tab disposed on one side of the mounting portion and another portion of said mounting tab disposed on an opposing side of the mounting portion, said mounting tab deflecting to a compressive state when said fastener is received by the fastener receiving structure to secure said housing assembly to the mounting portion of the vehicle with said stabilizing member adapted to engage a surface of the mounting portion in said compressive state.

16. The air bag module according to claim 15, wherein said mounting tabs and said stabilizing member are integrally formed from sheet metal, said stabilizing member being a stamped portion defining a protrusion on a bottom surface of the bracket.

17. A method of mounting an air bag module to a vehicle to sense a vehicle crash condition, the vehicle having a mounting portion for mounting the air bag module thereto, the mounting portion including at least one slot and a fastener receiving structure spaced from the at least one slot, comprising the steps of:

a) providing an air bag module comprising a housing assembly having first and second opposing ends, a mounting tab extending from the first end of the housing assembly, a stabilizing member protruding from a bottom surface of the housing assembly near the first end, and a fastener provided at the second end of the housing assembly, the fastener adapted to be received by the fastener receiving structure;

b) inserting the mounting tab into the at least one slot of the mounting portion such that a portion of the mounting tab is disposed on a first side of the mounting portion and another portion of the mounting tab is disposed on a second side of the mounting portion opposite the first side, the stabilizing member contacting the first side of the mounting portion; and c) inserting the fastener into the fastener receiving structure causing the mounting tab and the stabilizing member to be in a compressive state.

18. The method according to claim 17, wherein the housing assembly comprises a bracket with the mounting tab and the stabilizer member, and a housing secured to the bracket.

19. The method according to claim 18, wherein the vehicle mounting portion includes a pair of slots arranged in spaced relation and step a) further comprises providing a pair of mounting tabs in spaced relation at the first end of the housing, each of the mounting tabs being adapted to be inserted into a respective one of the slots.

20. The method according to claim 17, wherein step a) further comprises providing a flange portion at the second end of the housing assembly, and step c) comprises installing the fastener with respect to the flange portion.

21. The method according to claim 17, wherein the fastener is threaded and step c) includes rotatingly driving the threaded fastener into engagement with the fastener receiving structure.

22. The method according to claim 21, wherein the fastener receiving structure is a threaded nut secured to the second side of the mounting portion.

23. The method according to claim 17, wherein the at least one slot is provided in a sheet metal defining the mounting portion of the vehicle.

24. A method of mounting an air bag module to a vehicle to sense a vehicle crash condition, the vehicle having a mounting portion for mounting the air bag module thereto, the mounting portion including at least one slot and a fastener receiving structure spaced from the at least one slot, comprising the steps of:

a) providing an air bag module comprising a housing assembly having first and second opposing ends, a mounting tab extending from the first end of the housing assembly, and a fastener provided at the second end of the housing assembly;

b) inserting the mounting tab into the at least one slot of the mounting portion such that a portion of the mounting tab is disposed on a first side of the mounting portion and another portion of the mounting tab is disposed on a second side of the mounting portion opposite the first side; and c) inserting the fastener into the fastener receiving structure causing the mounting tab to be in a compressive state.

25. The air bag module according to claim 4, wherein said pinnacle forms a convex portion.

* * * * *